United States Patent [19]

Perks

[11] Patent Number: 5,157,847
[45] Date of Patent: Oct. 27, 1992

[54] APPARATUS AND METHOD FOR MEASURING THE DEPTH OF A RECESS

[75] Inventor: Andrew J. Perks, Staffs, England

[73] Assignee: Automated Associates, Inc., Arlington Heights, Ill.

[21] Appl. No.: 538,404

[22] Filed: Jun. 14, 1990

[51] Int. Cl.⁵ .......................... G01B 3/28; G01B 7/26; B07C 5/04
[52] U.S. Cl. ..................................... 33/836; 209/604; 209/929
[58] Field of Search .................. 33/836, 837; 209/552, 209/600, 601, 604, 929

[56] References Cited

U.S. PATENT DOCUMENTS

| | | | |
|---|---|---|---|
| 745,417 | 12/1903 | Church | 209/601 |
| 1,341,278 | 5/1920 | Morey | 209/929 |
| 1,411,169 | 3/1922 | Ehrman | 209/929 |
| 1,544,762 | 7/1925 | King | 209/601 |
| 2,422,036 | 6/1947 | Oakley | 209/604 |
| 2,493,147 | 1/1950 | Kasper | 209/929 |
| 2,792,938 | 5/1957 | Roe | 209/929 |
| 3,410,401 | 11/1968 | Drop | 209/600 |
| 3,539,006 | 11/1970 | Hanna | 209/929 |
| 3,731,795 | 5/1973 | Velthoven | 209/929 |
| 3,889,380 | 6/1975 | Albertazzi | 209/600 |

FOREIGN PATENT DOCUMENTS

| | | | |
|---|---|---|---|
| 0031457 | 3/1977 | Japan | 209/601 |
| 0151238 | 11/1980 | Japan | 209/601 |
| 0033501 | 4/1981 | Japan | 209/604 |
| 1459742 | 2/1989 | U.S.S.R. | 209/601 |
| 1148812 | 4/1969 | United Kingdom | 209/604 |
| 1604841 | 6/1982 | United Kingdom . | |
| 1604842 | 6/1982 | United Kingdom . | |

Primary Examiner—Thomas B. Will
Attorney, Agent, or Firm—Wood, Phillips, VanSanten, Hoffman & Ertel

[57] ABSTRACT

An apparatus for determining the depth of a recess formed in the end of articles such as headed fasteners having a first indexable article carrier with a plurality of article holders for supporting articles so that each article moves in a prescribed path as the article carrier is operated, a second indexable carrier mounted for synchronized motion with the first carrier having a plurality of reciprocable probes aligned with the article holders for engaging a recess of the articles, structure for incrementally indexing the carriers to position the article carrier alternatively in (a) a first position in which an article can be inserted therein from a supply, and (b) a second position spaced from the first position, a positioning mechanism for assuring registration of the probe free end and a recess on an article on the carrier as the probe free end and the carrier are relatively moved to the second position, structure for sequentially deploying the reciprocable probes into engagement with the articles, and a sensor for determining the degree of engagement of the reciprocable probes with the articles.

20 Claims, 5 Drawing Sheets

APPARATUS AND METHOD FOR MEASURING THE DEPTH OF A RECESS

BACKGROUND OF THE INVENTION

1. Field of the Invention

This invention relates to a method and apparatus for sensing the depth of a recess formed in the end of articles, such as headed fasteners.

2. Background Art

It is common in the manufacture of lightweight metal fasteners to produce the fasteners in an automated process, whereby hundreds of articles are formed each minute. In order to maintain a high degree of quality control, it is important to have the capability of examining a high volume stream of fasteners to determine critical dimensions of the articles, such as the depth of recesses formed in the head of the fastener.

Typically, a plurality of fasteners are advanced along a manufacturing line by means of physically engaging the extending flanges of a headed portion in a gripping mechanism and sequentially feeding the fasteners towards storage receptacles. A common way of efficiently feeding a fixed number of fasteners, say 10 or 20, in consecutive batches through an examination station is to load a batch of fasteners into a carriage which is then incrementally indexed through the examination station, whereby each fastener is in turn subjected to examination. The fasteners are supported within the carriage by means of engagement of the head of each fastener with an adapted receiving surface, with a shank portion of the fastener extending below the carriage.

In order to examine the external dimensions of an article, such as thread formation or fastener length, it is known (see Great Britain Patent Specification Nos. 1,604,841 and 1,604,842) to illuminate the fastener as it is supported on the carriage and project a magnified silhouette of the fastener onto an image-receiving sensor. Based upon a photoelectric determination of the dimension of the silhouette, electric signals are relayed to a controller which ultimately result in the examined fastener being either accepted or rejected.

A significant problem with the above examination technique is that the determination of a interior dimension of a fastener, such as the depth or formation of a concave recess formed in the head of the fastener, is precluded. While it is technically possible to measure the recesses formed in the fasteners determined to be 'acceptable' by the high speed examination of the external dimensions, such as by a handheld depth gauge, it is extremely inefficient to handle such a high volume of articles twice.

In addition to inefficiency, further problems exist with respect to performing automatic recess examinations. In order to determine the depth of a recess, one may engage a compleementary element, such as a die, with the head of the fastener and measure the amount of penetration of the die into the head to ascertain the acceptability of the recess. However, such a procedure is dependent upon the die being aligned with the contoured surfaces which define the recess in such a way as to allow complete interengagement of the two members. The alignment problem is aggravated by the fact that the fasteners are randomly oriented on the carriage. In the event that the die is misaligned prior to engagement, the distance which it may be inserted into the fastener is limited not by the depth of the recess, but instead by interference with a portion of the head. This may result in a signal which will cause rejection of an acceptable item. In order to obtain a reliable measurement of the depth of a recess automatically, it is imperative that the measuring gauge be capable of complete engagement with each fastener.

DISCLOSURE OF THE INVENTION

The present invention comprehends an improved recess measurement apparatus in which a plurality of light weight articles are sequentially subjected to a determination of the depth of the recess formed therein.

More particularly, the invention comprehends an apparatus for sensing the depth of a recess formed in an article such as a headed fastener including an indexable carrier for holding an article and a probe having a free end configured to seat in the recess of the article on the article carrier. Structure is provided for mounting at least one of the carrier and the probe free end for movement relative to the other to allow the probe free end and carrier to be alternatively relatively positioned in (a) a first retracted position and (b) a second engaged position. At least one of the carrier and probe free end move a predetermined distance as the relative position of the probe free end and carrier is changed from the first position toward the second position as the probe free end moves into the recess. A sensor is provided for sensing relative movement of the probe free end and the carrier that is a distance less than the predetermined distance and for giving an indication that the insufficient relative movement of the probe free end and the carrier is indicative of the fact that the recess on the fastener on the article carrier is unacceptable. Also envisioned is a positioning mechanism for assuring registration of the probe free end and the recess as the probe free end and the carrier are relatively moved to said second position.

In another aspect of the invention, the positioning mechanism includes structure for rotating the probe free end as an incident of the relative movement of the carrier and the probe free end between the first position and the second position to be certain that the probe free end extends fully within the recess.

The invention also comprehends an apparatus for sensing the depth of a recess formed in an article such as a headed fastener in which the article carrier is axially fixed and the probe moves toward the article carrier as the probe free end moves a predetermined distance from the first position toward the second position into the recess on the fastener.

In one form of the invention, the first and second carriers may be incrementally indexed to a third position between the first and second position for aligning an article within an article holder of the first carrier with a reciprocable probe on the second carrier.

In one form of the invention, the first and second carriers may be incrementally indexed to a fourth position downstream of the third position for retaining an article within an article holder of the first carrier.

In the illustrated embodiment, included are a plurality of conduits connected to a source of pressurized air and directed towards articles in the article holders for delivering air jets thereagainst and thereby expelling articles from the article carrier.

The invention further comprehends an apparatus for determining the depth of a recess formed in the end of articles such as headed fasteners, said apparatus having a first indexable article carrier with a plurality of article holders for supporting articles so that each article moves in a prescribed path as the article carrier is operated; a second indexable carrier mounted for synchronized motion with the first carrier having a plurality of reciprocable probes aligned with the article holders of the first carrier and having end surfaces adapted for engagement with articles supported by the article holders; structure for incrementally indexing the first and second carriers to position the article carrier alteratively in (a) a first position in which an article can be inserted therein from a supply, and (b) a second position spaced from the first position; registering structure for aligning the end surfaces of a probe with a receiving recess in an article; structure for sequentially deploying the reciprocable probes into engagement the said articles; and a sensor for determining the degree of engagement of the reciprocable probes with the fasteners.

In one form of the invention the second carrier consists of a rotatable body having circumferentially spaced bores for receiving the reciprocable probes and cylindrical sleeves between the bores and the reciprocable probes.

In one form, the deployment structure includes a radially extending arm connected to each of the cylindrical sleeves having a cam follower attached at the outer end thereof, and a cammed channel for receiving the cam follower as an article moves along the prescribed path.

In one embodiment, the end surfaces of a probe are registered with a receiving recess by rotating a probe within the second carrier relative to an article in the first carrier, and thrusting the aligned probe into engagement with the recess.

In one form of the invention, the structure for rotating a probe includes a radially extending pin projecting from a probe and a helical slot extending through a surrounding cylindrical sleeve, whereby axial movement of the probe relative to the sleeve produces rotation of the probe relative to the sleeve.

In one form, the apparatus has a helical spring connected between a reciprocable probe and a cylindrical sleeve for thrusting the probe into engagement with a fastener.

The invention still further comprehends a method for determining the depth of a recess formed in the end of an article including the steps of supporting a plurality of articles within article holders on a first indexable article carrier so that each article moves in a prescribed path as the article carrier is operated; mounting a second indexable carrier adjacent the first carrier for synchronous motion therewith, with the second carrier having a plurality of reciprocable probes aligned with the article holders of the first carrier and the reciprocable probes having end surfaces adapted for engagement with articles supported by the article holders; incrementally indexing the first and second carriers to position the article carrier alternatively in (a) a first position in which an article can be inserted therein from a supply, and (b) a second position spaced from said the position; registering the end surfaces of at least one reciprocable probe with a receiving recess in an article; sequentially deploying the reciprocable probes into engagement with said articles; and determining the degree of engagement of the probes with the recessed ends.

In one form, the method includes the step of incrementally indexing the first and said second carriers to a third position for aligning an article within an article holder of the first carrier with a superjacent reciprocable probe on the second carrier.

In one form, the method includes the step of incrementally indexing the first and said second carriers to a fourth position downstream of the third position for retaining an article within an article holder of the first carrier as a reciprocable probe is disengaged therefrom.

The invention is particularly adapted to inspect fasteners having a head end with a recess formed therein and an integral shank. The shank extends through a slot in the first carrier and is suspended therefrom by the head.

The invention also comprehends the step of ejecting articles from the first carrier subsequent to a determination of the depth of the recess formed in the head.

BRIEF DESCRIPTION OF THE DRAWINGS

Other features and advantages of the invention will be apparent from the following description taken in connection with the accompanying drawings wherein.

BEST MODE FOR CARRYING OUT THE INVENTION

Figure 1:
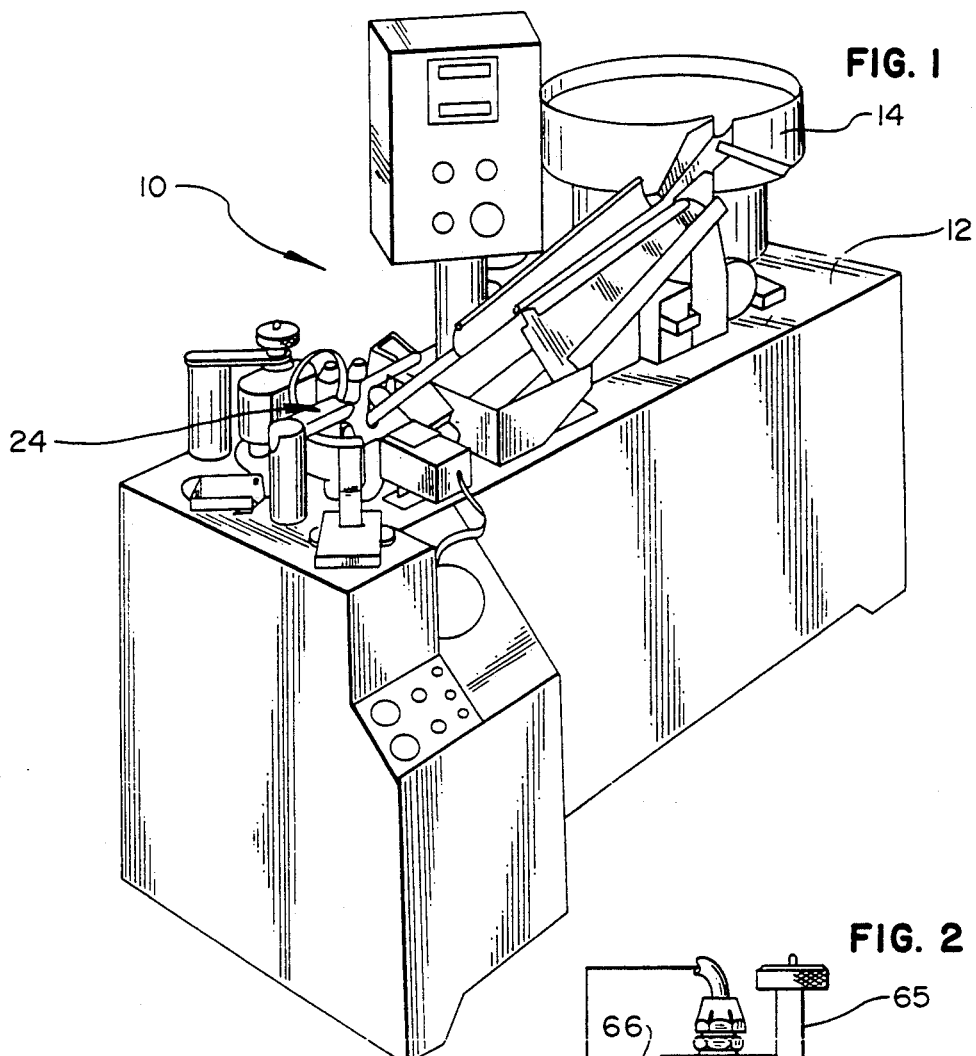
FIG. 1 is a perspective view of an apparatus for performing high volume inspection of discrete articles according to the present invention.

An inspection/sorting apparatus, suitable for incorporation of the present invention, is shown in FIG. 1 at 10, with details thereof depicted in FIGS. 2-7. The apparatus 10 has a support housing 12 on which is mounted a container 14, in the form of a hopper, for accepting a supply of discrete articles to undergo examination. The apparatus 10 is described herein as it would be used to examine screw fasteners 16, each having a shank portion 18 with a center axis 20 and a concentric head portion 22 with a recess 23 (FIG. 5) integral therewith. Two exemplary, well-known recess configurations are identified in the industry as Phillips and Torx. On a Phillips head, there are crossing slots which accept a matching screwdriver blade in any of four different positions. The apparatus 10 is designed to determined the depth of the recess 23 in the head portion 22 on the screw fastener 16 at an examination station 24. It should be understood that one or more additional inspections can be carried out on the screw fasteners 16 on the apparatus 10, however, the focus will be on the inventive depth sensing structure for the recess 23 on the head portions 22.

Additional details of the overall apparatus 10, peripheral to the examination/gauging station 24, are omitted herein and are set out fully in British Patent Specification Nos. 1,604,841 and 1,604,842. It suffices to say that the apparatus 10 has a means at 26 for delivering the blanks/fasteners 16 from the supply in the container 14 in succession to the examination station 24 in a head-up orientation.

Figure 3:
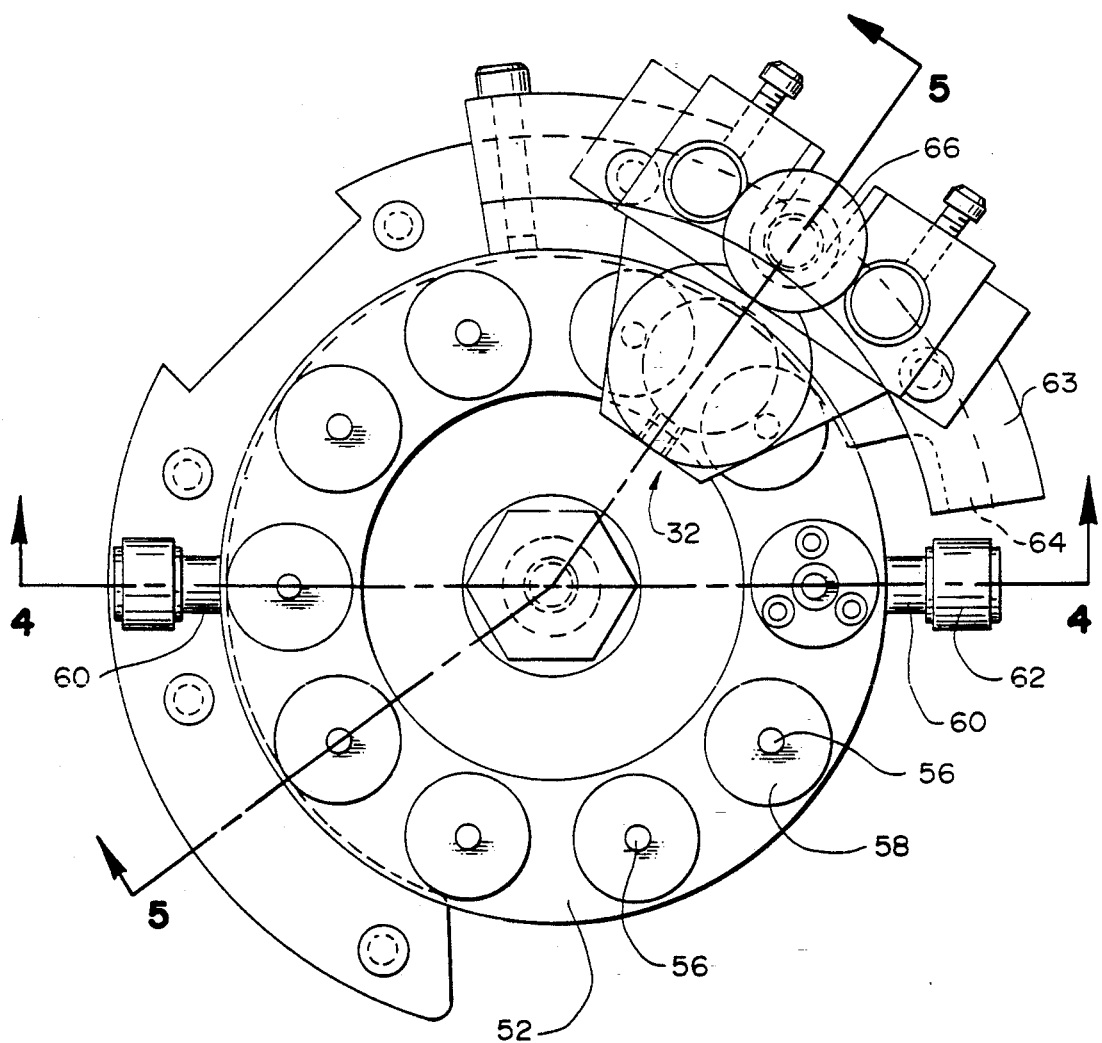
FIG. 3 is an enlarged plan view of the examination assembly in FIG. 2.
Figure 6:
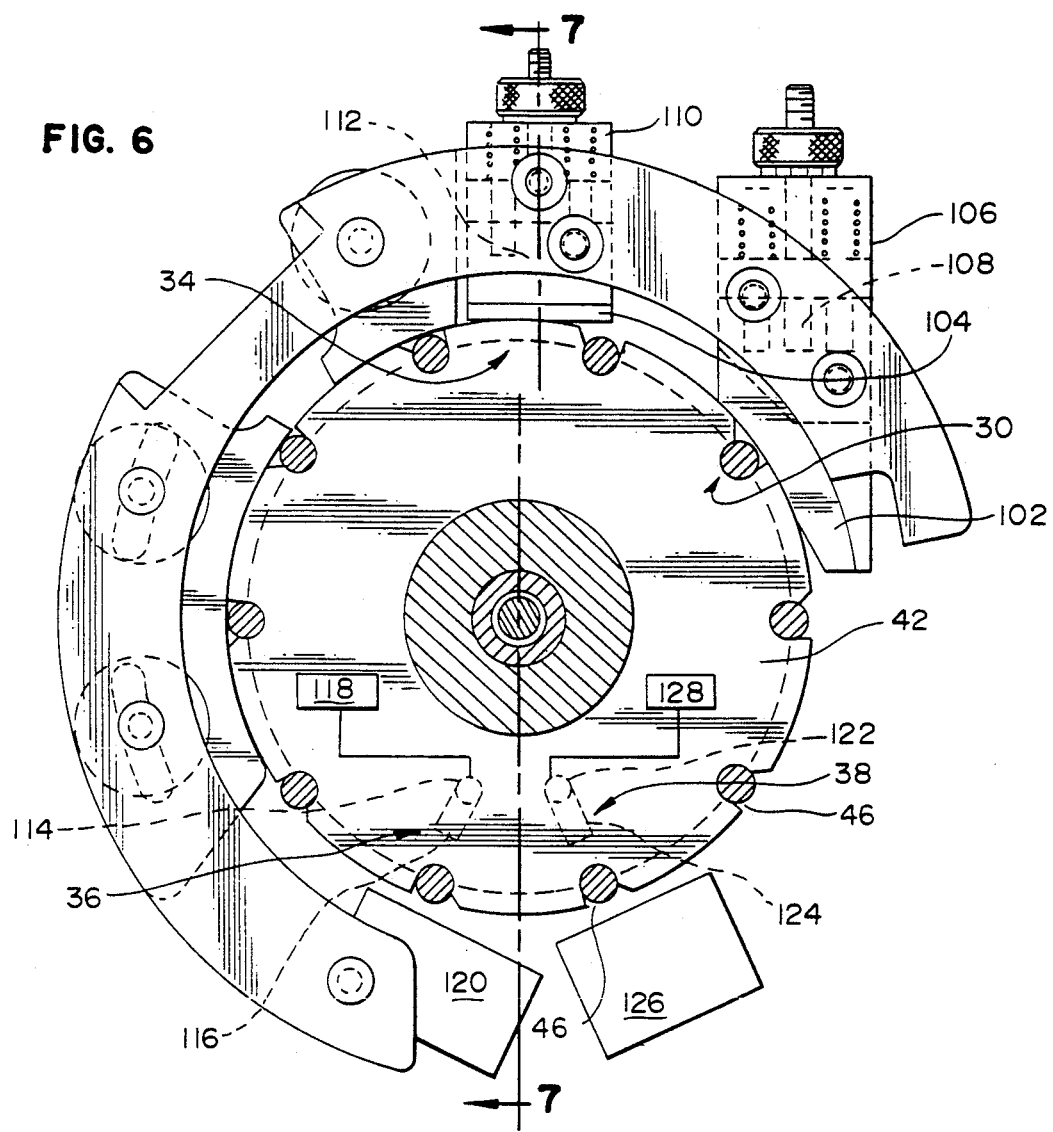
FIG. 6 is an enlarged sectional plan view of the examination assembly.

Carrier/advancing means at 28 is provided for receiving the fasteners 16 from the delivery means 26, advancing the fasteners 16 serially through a centering station 30, a gauging station 32, a retraction station 34, a pass station 36, and finally to a reject station 38 (FIGS. 3,6). Gauging means at 40 is provided adjacent the carrier/advancing means 28 for examining the recesses 23 formed in the head portions 22 of the fasteners 16 carried thereon.

Figure 2:
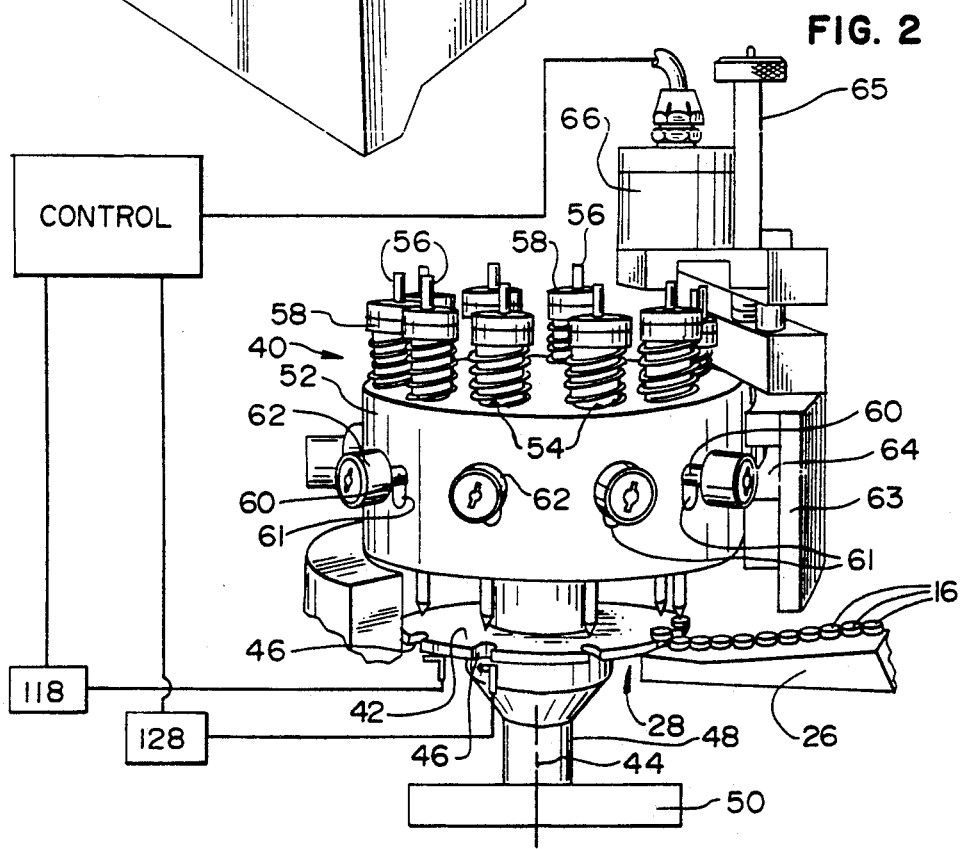
FIG. 2 is an enlarged perspective view of an article examination assembly on the apparatus of FIG. 1.

The carrier means 28 includes an article carrying disc 42 mounted for rotation about a vertical axis 44 and having equidistantly spaced, radially extending article holders/slots 46 about its periphery which receive fasteners 16 from the delivery means 26 and support the same head up as shown in FIG. 2. The disc 42 rotates to advance the fasteners 16 through the stations 30,32,34,36, and 38 as described above. The disc is carried by a vertical shaft 48 connected at its lower end to a driving motor 50 mounted in the housing 12.

The gauging means 40 is disposed at the examination station 24 and has a rotary carriage 52 mounted adjacent the article carrying disc 42 for rotation about the vertical axis 44 of the shaft 48. As will be described in further detail below, the carriage 52 has a plurality of axial bores 54 which receive elongate probes 56 with concentric sleeves 58, the sleeves 58 having radially extending arms 60 which project through slots 61 in the carriage 52. Rotary cam followers 62 are disposed one each at the outer ends of internal shafts mounted within the radial arms 60. The gauging means 40 further includes an arcuate track housing 63 with a positioning mechanism 65 adjacent the rotary carriage 52 and defining a channel 64 for successively receiving the cam followers 62 of each radial arm 60 as the carriage is incrementally rotated. A photo electric sensor 66 is mounted on the track housing 63 for purposes as will be shown.

Figure 4:
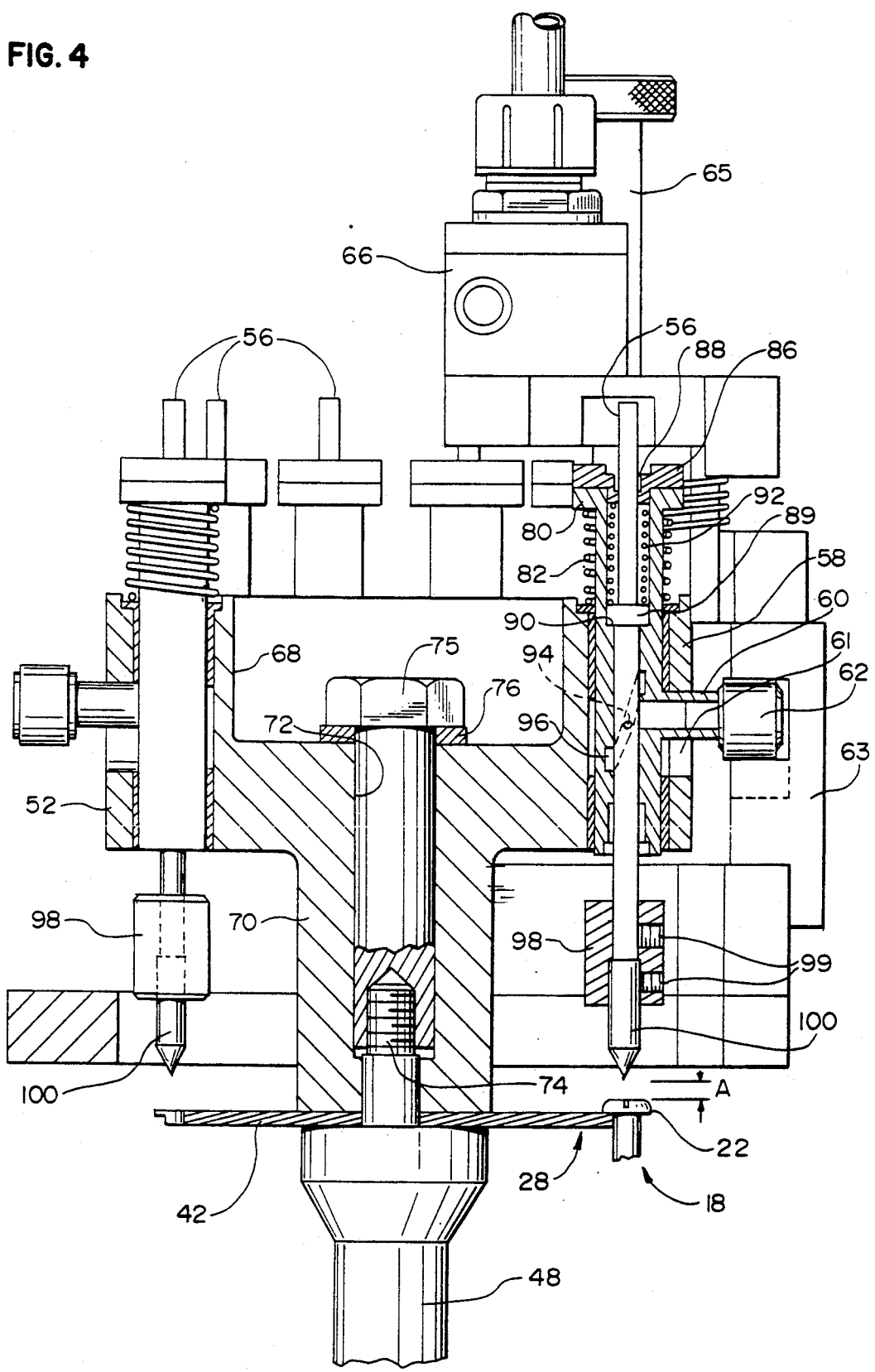
FIG. 4 is a cross-sectional view of the examination assembly taken along line 4—4 of FIG. 3.
Figure 5:
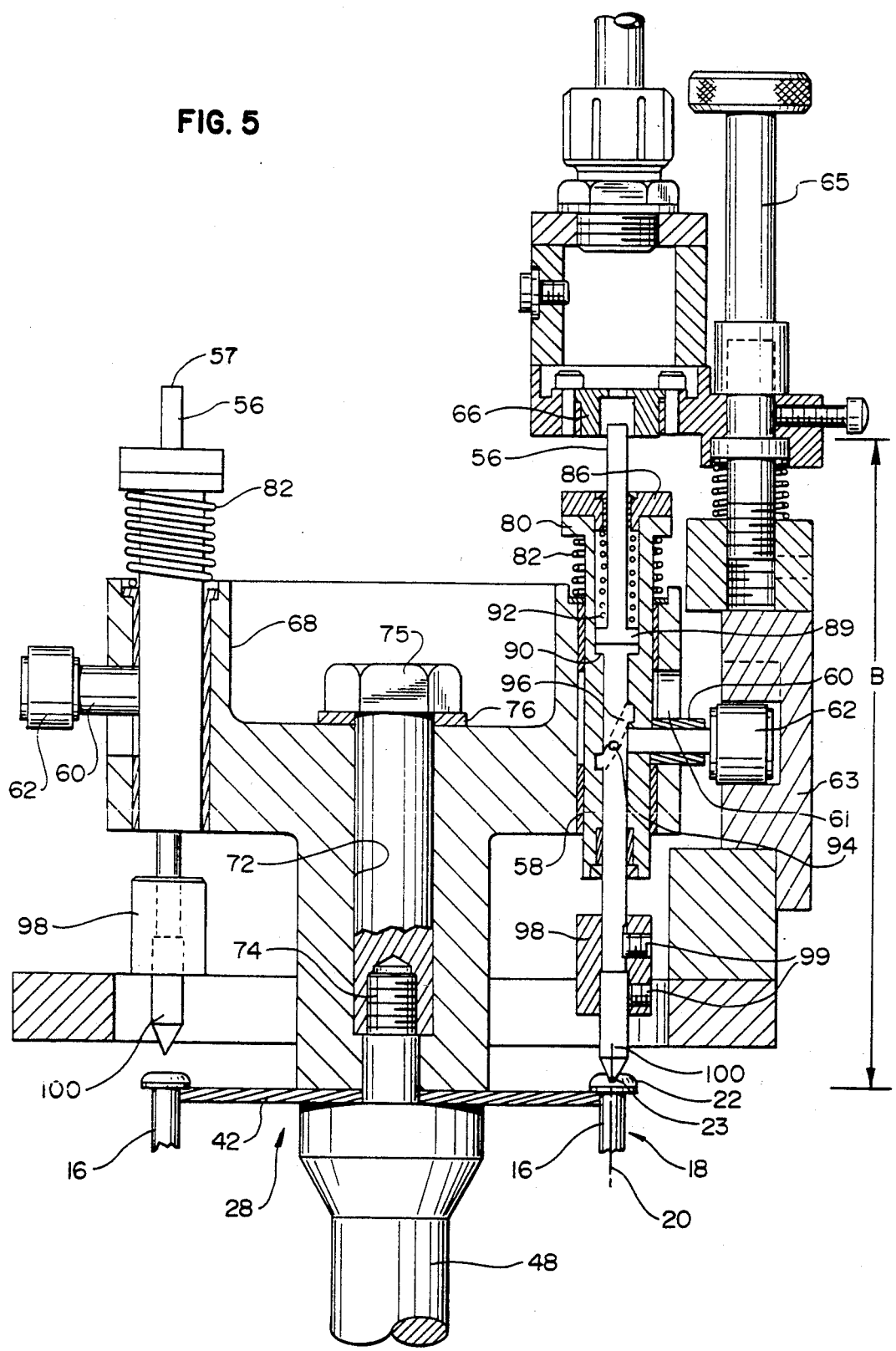
FIG. 5 is a cross-sectional view of the examination assembly taken along line 5—5 of FIG. 3.

Referring to FIGS. 4 and 5, the rotary carriage 52 comprises a cylindrical carousel 68 with an integral, coaxial, depending neck 70. The neck 70 has a concentric bore 72 for receiving an upstanding threaded nipple 74 projecting from the shaft 48 and passing through the article carrying disc 42. A headed nut 75 is extended through a washer 76 into the bore 72 and threadably engages the nipple 74, such that the carriage 52 and disc 42 are fixedly secured to the shaft 48 for synchronous rotation therewith.

The sleeves 58 of the gauging means 40 extend through the circumferentially and equidistantly spaced bores 54 in the carriage 52 and each has an enlarged head 80 integral with the upper end thereof. A helical spring 82, surrounding an exposed part of each sleeve 58, is captured between the carriage 52 and head 80 such that each sleeve 58 is normally biased axially upwardly within its respective bore 54. Each bore 54 further has a centering cap 86 with a concentric aperture 88 therein for accommodating the upper end of a probe 56 which extends therethrough.

Each probe 56 comprises an elongate rod with a positioning ring 89 fixed along the length thereof which normally rests against a shoulder 90 formed within each sleeve 58. In this way, a probe 56 is precluded from falling through its associated sleeve 58. An inner helical spring 92 is positioned between the centering cap 86 and positioning ring 89 and acts to bias the probe 56 for axial displacement relative to the sleeve 58. Each probe 56 further has a radially projecting pin 94 which is received by a spiral groove 96 formed on the inner face of each sleeve 58. The probes 56 extend downwardly from the carriage 52 to a point near the article carrying disc 42 wherein a chuck 98 is provided with a pair of set screws 99 for coupling the probe 56 with a preferably shaped die bit 100 matched to the configuration of the recesses 23.

The centering station 30 and retraction station 34 each have biased blades 102,104, respectively, for engaging a fastener 16 suspended from the article carrier 42. Specifically, a centering mechanism 106 is disposed along the periphery of the article carrier 42 at the centering station 30 and has a spring biased piston 108 for positioning the blade 102 into engagement with a fastener 16, thereby centering the fastener within the adjacent slot 46 of the disc 42. Similarly, a second centering mechanism 110 is disposed along the periphery of the article carrier 42 at the retraction station 34 and has a spring biased piston 112 for moving the blade 104 into engagement with a fastener 16. In this way, the fastener 16 is held firmly in place within the article holder 42 as a depth sensing probe 56 is withdrawn therefrom, as will be described, preventing the dislodging of the fastener 16 from the disc 42 during the retraction step.

The pass station 36 has a conduit 114 with a radially directed outlet arm 116 connected to a source of pressurized air 118 for directing a high pressure jet of air along the underside of the article carrier 42 and towards the shanks 18 of the fasteners 16 held within the article holders 46. In this way, controlled jets of air forcibly discharge predetermined accepted fasteners 16 away from the apparatus and into an accept receptacle 120. In a similar way, the reject station 38 has a conduit 122 with an arm 124 to produce a radially directed stream of air toward a fastener 16 carried by the article carrier 42 to thereby discharge any fastener 16 received at the reject station into an appropriate reject receptacle 126. The conduit 122 is supplied from a suitable pressurized supply 128.

Operation of the apparatus is best illustrated in FIGS. 2 through 7. A stream of fasteners 16 is serially advanced by the delivery means 26 under the influence of gravity, vibratory movement, or any other means, toward the disc 42. The disc 42 is indexed such that the fasteners 16 are consecutively moved into the article holders 46 aligned with the delivery means 26. While it should be noted that hundreds of fasteners 16 may be loaded into and discharged from the disc 42 in each minute of operation on the inspecting/sorting apparatus 10, the following description will trace the path of only a single fastener 16 through a cycle. The process below may be directly extrapolated to every fastener examined.

After a fastener 16 is received by the disc 42 aligned at the delivery means 26, indexing of the disc 42 moves the fastener 16 to the centering station 30, where spring-biased blade 102 of the centering mechanism 106 engages the shank 18 of the fastener 16 carried in the adjacent article holder 46 and applies a radially directed force to center the fastener 16 within the slot 46. As seen in FIG. 6, the centering blade 102 is in contact with a fastener 16 over an angular range of rotation of the disc 42. At this point, the probe 56 within the carriage 52 and aligned above the fastener 16 is in a retracted configuration, as shown in FIG. 4.

Subsequent incremental rotation of the disc 42 delivers the fastener 16 to the gauging station 32. As the disc 42 and rotary carriage 52 are synchronously rotated, the cam follower 62, mounted at the outer end of the radial arm 60 extending from the sleeve 58, is received by the ramped channel 64 of the track housing 63. As the carriage 52 and disc 42 are further rotated, engagement of the cam follower 62 with the ramped channel 64 acts to progressively drive the sleeve 58, probe 56, and arm 60 downward within the axial bore 54 of the carriage 52.

As the sleeve 58 is moved downward and toward the disc 42, the helical spring 82 is compressed between the head 80 of the sleeve 58 and the upper surface of the cylindrical carousel 68 while the probe 56 is similarly displaced until the die bit 100 mounted at the lower end thereof engages the subjacent fastener 16. At that point, continued downward movement of the sleeve 58 under the camming action of the follower 62 within the ramped channel 64 forces the probe 56 upwardly relative to the sleeve 58 and induces compression of the inner helical spring 92 between the positioning ring 89 and the centering cap 86. The probe 56 is continuously upwardly displaced relative to the sleeve 58 until the cam follower 62 reaches a bottommost portion of the ramped channel 64.

The photoelectric sensor 66 is positioned at the gauging station 32 such that the upper end 57 of the probe 56 passes directly thereunder at such time as the cam follower 62 has reached the bottommost portion of the ramped channel 64 and the probe 56 is thereby moved to a position of maximum displacement relative to the sleeve 58, such that the inner helical spring 92 is fully compressed and provides a downward biasing force against the positioning ring 89 of the probe 56. Through photoelectric sensing of the upper end 57 of the probe 56, an acceptable degree of engagement of the die bit 100 with the recess 23, and thus the acceptability of the depth of the recess 23, may be determined in a manner as will be shown.

In a retracted position (FIG. 4), the die bit 100 of the probe 56 is spaced a predetermined distance (A) from the head 22 of the fastener 16 as established by the geometry of the probe 56, the rotary carriage 52, and the thickness of the head 22. As the probe 56 is plunged downwardly under the action of the cam follower 62 within the ramped channel 64, the bit 100 engages the recess 23 (FIG. 5). The distance which the bit 100 penetrates the recess 23 of the head 22, and thus the measured depth of the recess 23, is equal to the total downward distance traveled by the die bit 100 less the initial predetermined distance (A). With this arrangement, it is possible to determine the acceptability of the recess depth with a determination of the total downward travel of the probe 56.

In order to sense the distance traveled by the probe 56 during a complete downward stroke, the position of the upper end 57 of the probe 56 at the fully engaged position (FIG. 5) is sensed with photo electric position sensor 66. The position sensor 66 is circumferentially mounted about the disc 42 at the gauging station 32 such that the probe 56 has reached a bottommost portion of its downward stroke, that is, with the die bit 100 in maximum penetration with the head 22 of the fastener 18, as the probe 56 passes under the sensor 66. The position sensor 66 is vertically spaced a predetermined distance (B) from the disc 42 by means of the position mechanism 65. The distance (B) is prescribed such that intersection of the electronic sensing beam of the sensor 66 by the upper end 57 of the subjacent fully deployed probe 56 is determinative of an unacceptable amount of downward displacement of the probe 56. Because the probe 56 has been fully deployed at this point, downward travel of the probe 56 is limited only by interference of the head 22 with the die bit 100. When the recess 23 is insufficiently deep or otherwise malformed so as to limit engagement with the die bit 100, the downward displacement of the probe 56 is similarly limited and sensed by means of the intercepted electronic beam of the sensor 66 at the upper end 57 of the probe 56. When a fastener 16 is "inspected" at the gauging station 32 and the electronic beam of the sensor 66 is not broken, it may be established that the probe 56 was downwardly displaced an acceptable level wherein the die bit 100 penetrated the head 22 a distance representative of an acceptably formed recess 23 within the head 22. In this event, an "accept" electrical signal is generated by the sensor 66 and relayed to the pass station 36 as will be shown.

As should be fully understood from the above description, it is imperative that in order to generate a reliable "accept" signal the die bit 100 be prevented from fully penetrating the head 22 of the fastener 16 only in situations where the recess 23 is incorrectly formed. This is not always the case in known devices wherein penetration of the head 22 can be restricted by interference of the die bit 100 with properly formed but improperly aligned receiving surfaces defining the recess 23. In the commonly known case of a Phillips head, the insertable bit 100 has a pair of symmetrically formed perpendicular edges (not shown) projecting from the end of the bit 100 for engaging complementary surfaces defining a recess 23 in a head 22. In order for the bit to fully engage the head 22, the edges on the end of the bit 100 must be angularly aligned with the complementary receiving surfaces of the recess 23. When such alignment is not provided, the bit 100 is prevented from penetrating the head 22 and is thereby precluded from engaging an otherwise properly formed recess 23. While a Phillips head has been used as an exemplar, it should be understood that the misalignment problem exists with virtually every type of die bit formation.

The present invention overcomes this problem in simple way. As described above, the probe 56 and die bit 100 are downwardly stroked within the sleeve 58 until the bit 100 is obstructed by the subjacent fastener 16. Once the downward displacement of the probe 56 and bit 100 is impeded, the probe is forced upwardly relative to the sleeve 58 as the sleeve as continually stroked downward under the action of the cam follower 62 within the ramped channel 64. At the point which the downward travel of the bit 100 is first obstructed, the bit has either fully engaged the recess 23 of the head 22, or, more likely, is not in exact angular alignment with the receiving surfaces of the recess 23 and as such abuts the upper surface of the head 22 under the biasing force of the compressed inner helical spring 92.

As the probe 56 moves upwardly relative to the sleeve 58, the pin 94 on the probe 56 is guided within the helical slot 96 on the inside of the sleeve 58 to forcibly rotate the probe. When the probe 56 and die bit 100 reach an aligned angular configuration in which the projecting surfaces on the end of the bit 100 are correctly positioned with respect to the complementary receiving surfaces of the recess 23, the bit 100 is resiliently forced into complete engagement with the recess 23 by means of the inner spring 92. As should be known, the typical recess 23 formed in a fastener head 22 is cyclic over an angular range of at least 90 degrees. For this reason, it is sufficient that the probe 56 be rotatable over a range of no more than 90 degrees. If, over the provided range of rotation the die bit 100 is not fully seated within the recess 23, it can be established that a structural defect exists with respect to the formation of the recess 23.

Figure 7:
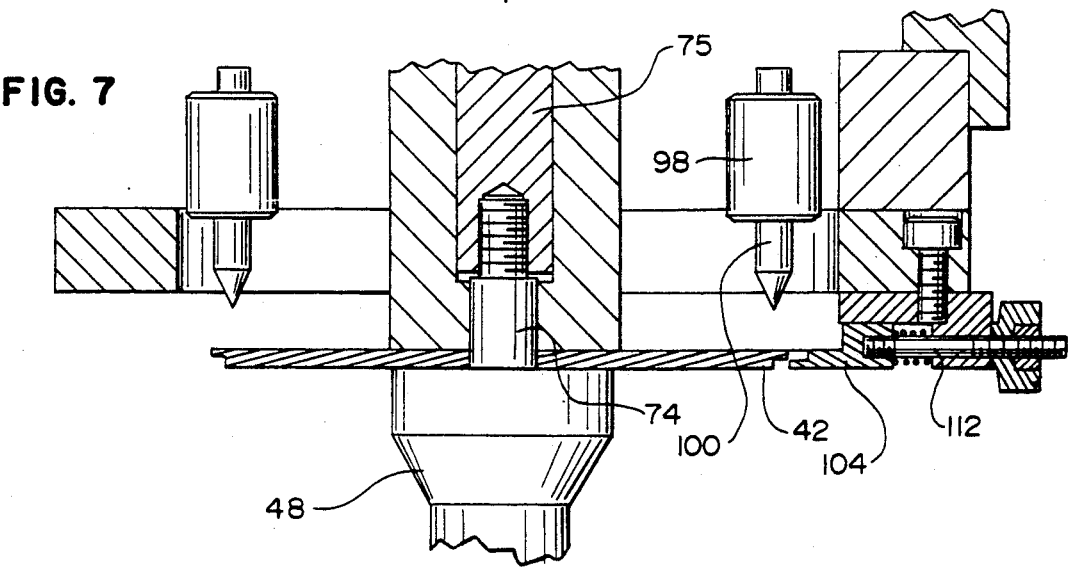
FIG. 7 is a partial cross-sectional view of the examination assembly taken along line 7—7 of FIG. 6.

Once the fastener recess 23 has been "inspected", the disc 42 and carriage 52 are further indexed. This rotation moves the cam follower 62 through an upwardly ramped portion of the channel 64, thereby retracting the die bit 100 from engagement with the recess 23 under the action of the compressed outer helical springs. In order to ensure that the fastener 16 is not dislodged from or drawn out of the disc 42 by the die bit 100 as the die bit 100 is retracted, a second spring-biased blade 104 comes into contact with the fastener 16 as the fastener is indexed toward the retraction station 34. As seen in FIGS. 6 and 7, the blade 104 pinches a fastener between the blade 104 and disc 42 as the die bit 100 is retracted. Similar to the centering station, the blade 104 engages the fastener 16 over an angular range of rotation of the disc 42. After the probe 56 is fully retracted from engagement with the fastener head 23, the disc 42 and carriage 52 are further indexed so that the fastener 16 is moved to the pass station 36. In the event that an accept signal was generated by the photoelectric sensor 66 at the gauging station 32, commonly known logic means relay to the pass station 36 and cause a charge of air to be released from the air source 118 so as to radially direct a pulse of high pressure air toward the shank 18 of the fastener 16 such that the fastener 16 is forcibly expelled from the disc 42 and into the accept storing receptacle 120. If the recess 23 of the head 22 does not have an acceptable configuration and an accept signal is not generated at the gauging station 32, no air is released from the air source 118 and the fastener 16 proceeds to the next index position.

Further indexing of the disc 42 and carriage 52 advances the fastener 16 toward the reject station 38. A continuous stream of air is directed through the conduit 122 from the air supply 128 radially toward an article holder 46 positioned at the reject station 38 such that any fastener 16 reaching that point is immediately expelled from the disc 42 and into a reject storage receptacle 126. With this arrangement, a fastener 16 is assured of being ejected from a seat on the disc 42 by the time the slot 46 carrying the fastener 16 has been indexed up to the reject station 38. Further indexing of the disc 42 returns the empty slot 46 to the line of incoming fasteners 16 for continuous feeding through the apparatus 10.

We claim:

1. An apparatus for sensing the depth of a recess formed in an article such as a headed fastener, said apparatus comprising:
    an indexable carrier for holding an article;
    a probe having a free end configured to seat in the recess of an article on the article carrier;
    means for mounting at lest one of the carrier and the probe free end for movement relative to the other of the carrier and the probe free end to allow the probe free end and carrier to be alternatively relatively positioned in a first retracted position and a second engaged position;
    the at least one of said carrier and probe free end moving a predetermined distance as the relative position of the probe free end and carrier is changed from said first position toward said second position and the probe free end moves into a recess in an article on said article carrier with an acceptable depth of a recess for an article on the article carrier;
    means for sensing relative movement of the probe free end and the carrier that is a distance less than said predetermined distance and for giving an indication that relative movement of said probe free end and said carrier is less than said predetermined distance to be indicative of the fact that the recess in an article on the article carrier is unacceptable; and
    means for rotating the probe free end as an incident of the relative movement of the carrier and the probe between the first position and the second position to assure registration of the probe free end and a recess in an article on said carrier as the probe free end and the carrier are relatively moved to said second position.

2. An apparatus for sensing the depth of a recess formed in an article such as a headed fastener, said apparatus comprising:
    an indexable article carrier;
    means for holding an article to be inspected on said article carrier in an inspection position;
    a probe having a free end configured to seat in the recess of an article in the inspection position;
    means for mounting the probe for movement relative to the carrier between a first retracted position and a second engaged position and for advancing the probe from the first position toward the second position to effect penetration of a recess in an article in the inspection position, said means for mounting having a helical slot,
    said probe free end moving a predetermined distance from said first position toward said second position into a recess in an article in said inspection position with an acceptable depth of a recess for a fastener an article in the inspection position;
    means for sensing movement of the probe free end a distance less than said predetermined distance from said first position toward said second position into a recess in an article in said inspection position and for giving an indication that said probe free end has moved less than said predetermined distance to be indicative of the fact that the recess in an article in the inspection position is unacceptable; and
    a pin projecting from the probe and received in the helical slot such that movement of said probe relative to said means for mounting causes rotation of said probe relative to said carrier to assure that the probe free end extends fully within a recess in an article.

3. An apparatus for sensing the depth of a recess formed in the end of articles such as headed fasteners, said apparatus comprising:
    a first indexable article carrier;
    a plurality of article holders on said first article carrier for supporting articles so that each article moves in a prescribed path as the article carrier is indexed;
    a second indexable carrier mounted for synchronous motion with said first carrier;
    a plurality of reciprocable probes on said second carrier each having an axis in vertical alignment with the article holders of said first carrier, said reciprocable probes being axially movable relative to said second carrier and having free ends configured to seat in the recesses of articles on said first article carrier;
    means for incrementally indexing said first and said second carriers to position said article carriers alternatively in (a) a first position in which an article can be inserted therein from a supply, and (b) a second position axially spaced from said first position;

means for assuring registration of the probe free end and a recess on an article on said first carrier as an incident of the probe free end and the second carrier moving relatively to said second position;

means for sequentially deploying said reciprocable probes into the recesses with said articles; and means for sensing the amount of penetration of said reciprocable probes into said articles.

4. The apparatus of claim 3 having means for incrementally indexing said first and said second carriers to a third position intermediate said first and said second position, and having means adapted for positioning an article within an article holder of said first carrier in coaxial alignment with a superjacent reciprocable probe on said second carrier.

5. The apparatus of claim 4 having means for incrementally indexing said first and said second carriers to a fourth position downstream of said third position, and having means adapted for retaining an article within an article holder of said first carrier.

6. The apparatus of claim 3 having means for expelling articles from said first carrier.

7. The apparatus of claim 6 wherein said article expelling means include a plurality of conduits connected to a source of pressurized air and directed toward said article holders for delivering air jets thereto.

8. The apparatus of claim 3 wherein said penetration sensing means comprises photoelectric means.

9. The apparatus of claim 3 in conjunction with a means for automatically delivering articles to article holders in said first position.

10. An apparatus for determining the depth of a recess formed in the end of articles such as headed fasteners, said apparatus comprising:

a first indexable article carrier;

a plurality of article holders on said first article carrier for supporting articles so that each article moves in a prescribed path as the article carrier is operated;

a second indexable carrier mounted for synchronized motion with said first carrier;

a plurality of reciprocable probes on said second carrier and aligned with the article holders of said first carrier, said reciprocable probes having free end surfaces adapted for engagement with articles supported by said article holders;

means for incrementally indexing said first and said second carriers to position said article carrier alternatively in (a) a first position in which an article can be inserted therein from a supply, and (b) a second position spaced from said first position; and interengaged registering means intermediate said second carrier and said probes for angularly aligning said free end surfaces of said probes with a receiving recess formed in an article in response to relative movement between said probes and said second carrier;

means for sequentially deploying said reciprocable probes into engagement with said articles; and means for determining the degree of engagement of said reciprocable probe free end surfaces with said article recesses.

11. The apparatus of claim 10 wherein said second carrier comprises a rotatable body having circumferentially spaced bores for receiving said reciprocable probes and cylindrical sleeves disposed intermediate said bores and said reciprocable probes.

12. A method for determining the depth of a recess formed in the end of an article comprising the steps of:

supporting a plurality of articles within article holders on a first indexable article carrier so that each article moves in a prescribed path as the article carrier is operated;

mounting a second indexable carrier adjacent said first carrier for synchronous motion therewith, said second carrier having a plurality of reciprocable probes aligned with the article holders of said first carrier, said reciprocable probes having end surfaces adapted for engagement with articles supported by said article holders;

incrementally indexing said first and said second carriers to position said article carrier alternatively in (a) a first position in which an article can be inserted therein from a supply, and (b) a second position spaced from said first position;

registering at least one of said reciprocable probes with an article so that the adapted end surfaces of said probe are angularly aligned with a receiving recess in an article;

sequentially deploying said reciprocable probes into engagement with said articles;

turning each probe as an incident of its respective deployment to assure complete registration of the probe and recessed article ends; and determining the degree of engagement of said reciprocable probes with said recessed ends.

13. The method of claim 12 including the step of incrementally indexing said first and said second carriers to a third position for aligning an article within an article holder of said first carrier with a superjacent reciprocable probe on said second carrier.

14. The method of claim 13 including the step of incrementally indexing said first and said second carriers to a fourth position downstream of said third position and retaining an article within an article holder of said first carrier as said reciprocable probe is disengaged therefrom.

15. The method of claim 14 wherein the articles are headed fasteners with a shank and including the step of supporting the fasteners on said first carrier by resting the heads of the fasteners on the first carrier.

16. The method of claim 12 including the step of ejecting the articles from the first carrier subsequent to the determination of the depth of the recess formed in the article.

17. An apparatus for determining the depth of a recess formed in the end of articles such as headed fasteners, said apparatus comprising:

a first indexable article carrier;

a plurality of article holders on said first article carrier for supporting articles so that each article moves in a prescribed path as the article carrier is operated;

a second indexable carrier mounted for synchronized motion with said first carrier;

a frame in which the article carriers are mounted;

a plurality of reciprocable probes on said second carrier and aligned with the article holders of said first carrier, said reciprocal probes having free end surfaces adapted for engagement with articles supported by said article holders, said second carrier comprising a rotatable body having circumferentially spaced bores for receiving said reciprocable probes and cylindrical sleeves disposed intermediate said bores and said reciprocable probes;

means for incrementally indexing said first and said second carriers to position said article carrier alternatively in (a) a first position in which an article can be inserted therein from a supply, and (b) a second position spaced from said first position;

registering means on said second carrier for annularly aligning said free end surfaces of said probes with a receiving recess formed in an article;

means for sequentially deploying said reciprocable probes into engagement with said articles, said deployment means including an arm connected to each of said cylindrical sleeves and extending radially therefrom, each of said arms having a cam follower disposed at a distal end thereof, said frame having a cammed channel for receiving said cam follower as an article moves along said prescribed path; and means for determining the degree of engagement of said reciprocable probe free end surfaces with said article recesses.

18. The apparatus of claim 17 wherein said registering means for aligning the end surfaces of a probe with a receiving recess includes means for rotating a probe on said second carrier relative to an article in an article holder of said first carrier, and means for thrusting an aligned probe into engagement with a receiving recess of an article.

19. The apparatus of claim 18 wherein said means for rotating a probe on said second carrier includes a radially extending pin projecting from a probe and a helical slot extending through said interposed cylindrical sleeve for receiving said radial pin, whereby axial movement of said probe relative to said sleeve produces rotation of said probe relative to said sleeve.

20. The apparatus of claim 18 having a helical spring connected between a reciprocable probe and a cylindrical sleeve wherein said probe thrusting means comprises a biasing force developed by said helical spring.

* * * * *

UNITED STATES PATENT AND TRADEMARK OFFICE
CERTIFICATE OF CORRECTION

PATENT NO. : 5,157,847
DATED : October 27, 1992
INVENTOR(S) : Andrew J. Perks

It is certified that error appears in the above-indentified patent and that said Letters Patent is hereby corrected as shown below:

On the title page, Item [73]: the correct name of the assignee is: "Automation Associates, Inc."

Signed and Sealed this

Twenty-ninth Day of March, 1994

Attest:

BRUCE LEHMAN

*Attesting Officer*  Commissioner of Patents and Trademarks